G. A. H. ROBBINS AND S. F. E. EINSIEDEL.
RESILIENT CORE FOR MOTOR TIRES.
APPLICATION FILED APR. 27, 1921.
1,423,580.  Patented July 25, 1922.
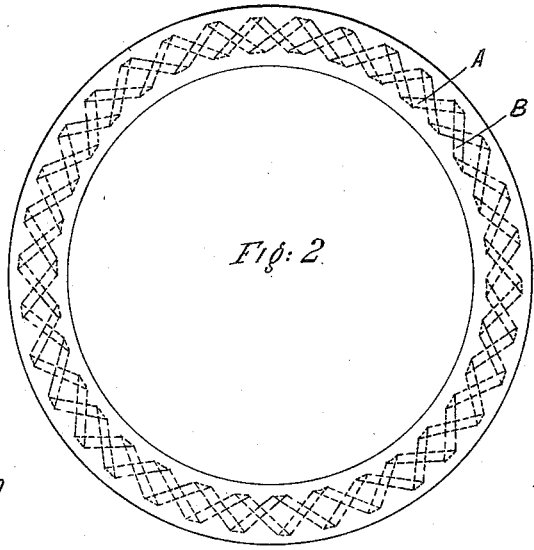
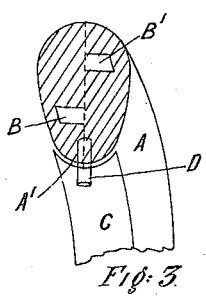
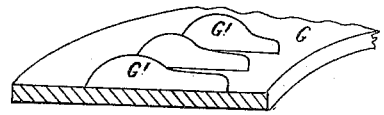
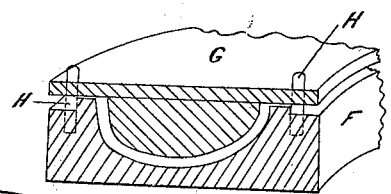
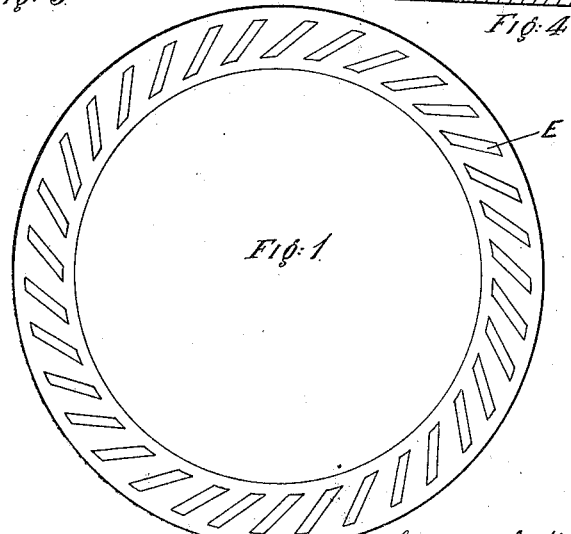
George A. H. Robbins
Stanley F. E. Einsiedel
Inventors
By their Attorney
Wm Wallace White

UNITED STATES PATENT OFFICE.

GEORGE ARTHUR HOWARD ROBBINS AND STANLEY FERDINAND ERIC EINSIEDEL, OF BRISBANE, QUEENSLAND, AUSTRALIA.

RESILIENT CORE FOR MOTOR TIRES.

1,423,580.	Specification of Letters Patent.	Patented July 25, 1922.

Application filed April 27, 1921. Serial No. 464,922.

*To all whom it may concern:*

Be it known that we, GEORGE ARTHUR HOWARD ROBBINS and STANLEY FERDINAND ERIC EINSIEDEL, subjects of the King of the United Kingdom of Great Britain and Ireland, residing at Brisbane, in the State of Queensland, Commonwealth of Australia, have invented new and useful Improvements in Resilient Cores for Motor Tires, of which the following is a specification.

This invention relates to an improved resilient core for motor tires and apparatus and method employed for manufacturing same.

The object of the present invention is to provide a resilient core as a substitute for pneumatic tubes and which can be easily fitted to the rim of the wheels. A further object of the invention is to eliminate the defects in the resilient cores hitherto used which have made them unacceptable to motorists, as they do not afford a uniform resiliency at every degree along the tread of the tire. Such tires being composed of a series of separate air chambers divided by rubber pillars are subject to developing shocks as when the tire strikes a stake or other obstruction on the road immediately opposite one of the pillars a distinct vertical shock is felt. Should contact with the obstruction take place opposite one of the air chambers, the obstruction may be forced into the air chamber with dire results, or the air in the chamber be compressed which in addition to producing heat, bulges the sides of the chamber and forces the wall of the tire away from the adjacent rubber pillars and sets up a movement of the core known as creeping, causing chafing of the core and tire.

Tires fitted with the cores hitherto used are also liable to a side movement known as rolling, which breaks the tires at the beads caused by the shape of the core at the base and prevents their coming into immediate contact with the rim of the wheel.

The invention consists in making the resilient core with two endless spiral air passages extending around the interior, by casting the core in two halves in a mould and vulcanizing and cementing the two halves together as hereinafter explained.

To fully describe the invention, reference is now made to the drawings in which:—

Fig. 1, is an interior plan view of one half of the core showing a series of recesses forming part of the air passages.

Fig. 2, plan view showing in dotted lines the two endless spiral air passages when the two halves of the core have been cemented together.

Fig. 3, cross section of core showing air passages and perspective view of circular half round plate.

Fig. 4, cross section of top and bottom moulds partly in perspective.

Fig. 5, broken perspective view of underside of top mould showing projections for forming the recesses in each half of the core for producing the endless spiral air passages.

The reference letters indicate like parts in all figures.

A is the core formed with a rounded base A' as shown in Fig. 3, B and B' the spiral air passages, C a circular half round plate and D a short tube of which there are two one opposite the other; these tubes and the half round circular plate are used in the construction of the core as hereinafter explained. E are the recesses formed in each half of the core by the projections on the top mould.

F is a circular bottom mould, G a circular top mould provided with projections G', H dowels fitted in the bottom mould of which there are a number and which project through the top mould for keeping same in correct position.

In manufacturing the core a quantity of specially prepared rubber compound or other suitable elastic material is placed in the cavity of the bottom mould F, the top mould G is then placed upon the bottom mould with the projections G' downwards which form the recesses E by pressing into the rubber compound which is effected by clamping the moulds together. The moulds together with the rubber compound are then placed in a steam heated pan and allowed to remain therein until the rubber compound becomes semi-vulcanized. The two halves of the core each having been formed and treated in a similar manner are then removed from the moulds and placed on the half round circular band with their vertical sides and recesses opposed to each other and cemented together; the circular band C together with the tubes D ensuring an exact join.

The core is then bound tightly to the circular band C by means of strips of canvas or other suitable material and again placed in a steam heated pan and the steam passing through the tubes D into the air passages circulates through same and vulcanization of the whole of the core is completed.

The canvas strips and the tubes are then removed and the core sprung from off the circular band in a finished state, an outer cover can then be fitted forming a complete resilient tire.

The endless spiral air passages in the core provides for uniform resiliency throughout the tire and serves to keep the same cool.

What we do claim as our invention and desire to secure by Letters Patent is:—

An improved resilient core for motor tires composed of elastic material having a round base and provided with two interior endless and uninterrupted zig-zag air passages whereby constant air circulation is maintained and a uniform resiliency attained throughout the tire.

In testimony whereof they have signed their names to this specification.

GEORGE ARTHUR HOWARD ROBBINS.
STANLEY FERDINAND ERIC EINSIEDEL.